US012782722B2

(12) United States Patent
Chen et al.

(10) Patent No.: US 12,782,722 B2
(45) Date of Patent: Nov. 3, 2026

(54) MOTORCYCLE HEAD-UP DISPLAY

(71) Applicant: KINPO ELECTRONICS, INC., New Taipei City (TW)

(72) Inventors: Yu-Chi Chen, New Taipei City (TW); Hsien-Chung Chen, New Taipei City (TW); Sheng-Chang Wu, New Taipei City (TW)

(73) Assignee: KINPO ELECTRONICS, INC., New Taipei City (TW)

( * ) Notice: Subject to any disclaimer, the term of this patent is extended or adjusted under 35 U.S.C. 154(b) by 877 days.

(21) Appl. No.: 18/119,323

(22) Filed: Mar. 9, 2023

(65) Prior Publication Data

US 2024/0219716 A1 Jul. 4, 2024

(30) Foreign Application Priority Data

Dec. 29, 2022 (TW) .................................. 111150690

(51) Int. Cl.

| | |
|---|---|
| ***G02B 27/01*** | (2006.01) |
| ***B62J 45/41*** | (2020.01) |
| ***B62J 45/42*** | (2020.01) |
| ***B62J 50/22*** | (2020.01) |
| ***G06T 7/50*** | (2017.01) |

(52) U.S. Cl.

CPC .......... *G02B 27/0101* (2013.01); *B62J 45/41* (2020.02); *B62J 45/42* (2020.02); *B62J 50/22* (2020.02); *G06T 7/50* (2017.01); *G06T 2207/30252* (2013.01)

(58) Field of Classification Search

CPC ...... G02B 27/0101; G02B 27/01; B62J 45/41; B62J 45/42; B62J 50/22; G06T 7/50; G06T 2207/30252

See application file for complete search history.

(56) References Cited

FOREIGN PATENT DOCUMENTS

| | | | | |
|---|---|---|---|---|
| KR | 20010095276 A | * | 11/2001 | ............. G02B 27/01 |
| WO | WO-2023180419 A1 | * | 9/2023 | ......... G02B 27/0149 |

* cited by examiner

*Primary Examiner* — Justin W Rider

(74) *Attorney, Agent, or Firm* — HDLS IPR SERVICES; Chun-Ming Shih

(57) ABSTRACT

A motorcycle head-up display (HUD) applicable to a motorcycle is provided. The motorcycle includes a motorcycle head and an electronic control unit. The HUD includes a display lens, a driving module, a projecting module, and a controller. The display lens is disposed on an upper surface of the motorcycle head. The driving module is configured to control a height of the display lens respective to the upper surface. The projecting module is disposed inside an accommodating space of the motorcycle head and configured to output a projecting image onto the display lens. The controller is connected to the projecting module and the driving module and configured to retrieve riding information of the motorcycle from the electronic control unit and generate a first command according to the riding information. The driving module is configured to control a movement of the display lens according to the first command.

19 Claims, 11 Drawing Sheets

MOTORCYCLE HEAD-UP DISPLAY

BACKGROUND OF THE DISCLOSURE

Technical Field

The disclosure generally relates to a display device, and more particularly, to a head-up display device applicable to a motorcycle.

Description of Related Art

The head-up display (HUD) is the product that projects the image onto the glass based on the optical principle and is provided for the driving seat of the car. The head-up display projects the driving information (such as the speed or the navigation information) onto the windshield of the car, so the driver can check the driving information on the windshield without lowering his or her head for the dashboard while driving and the driving safety is improved.

The motorcycle is another type of common road transport, and the rider of the motorcycle also needs to check the dashboard by lowering his or her head. Though the HUD applicable to the car may be disposed on the motorcycle, it is difficult to implement the HUD on the motorcycle because the structure of the motorcycle is different from the structure of the car, for example, the motorcycle does not have a windshield like a car. Accordingly, how to install a stable HUD on the motorcycle and provide the driving information on the motorcycle head-up display for the rider is the problem to be solved.

SUMMARY OF THE DISCLOSURE

The present disclosed example is directed to a motorcycle head-up display applicable to a motorcycle, such that a rider can easily check the motorcycle head-up display and get information about the motorcycle. The motorcycle head-up display also maintains the stability of the deployment and the display.

One of the exemplary embodiments is to provide a motorcycle head-up display applicable to a motorcycle including a motorcycle head and an electronic control unit. The motorcycle head-up display includes a display lens, a driving module, a projecting module, and a controller. The display lens is disposed on an upper surface of the motorcycle head. The driving module is configured to control a height of the display lens respective to the upper surface. The projecting module is disposed inside an accommodating space of the motorcycle head and configured to output a projecting image onto the display lens. The controller is connected to the projecting module and the driving module and configured to retrieve riding information of the motorcycle from the electronic control unit and generate a first command according to the riding information. The driving module is configured to control a movement of the display lens according to the first command.

It is to be understood that both the foregoing general description and the following detailed description are by examples, and are intended to provide further explanation of the disclosure as claimed.

DETAILED DESCRIPTION

Figure 1:
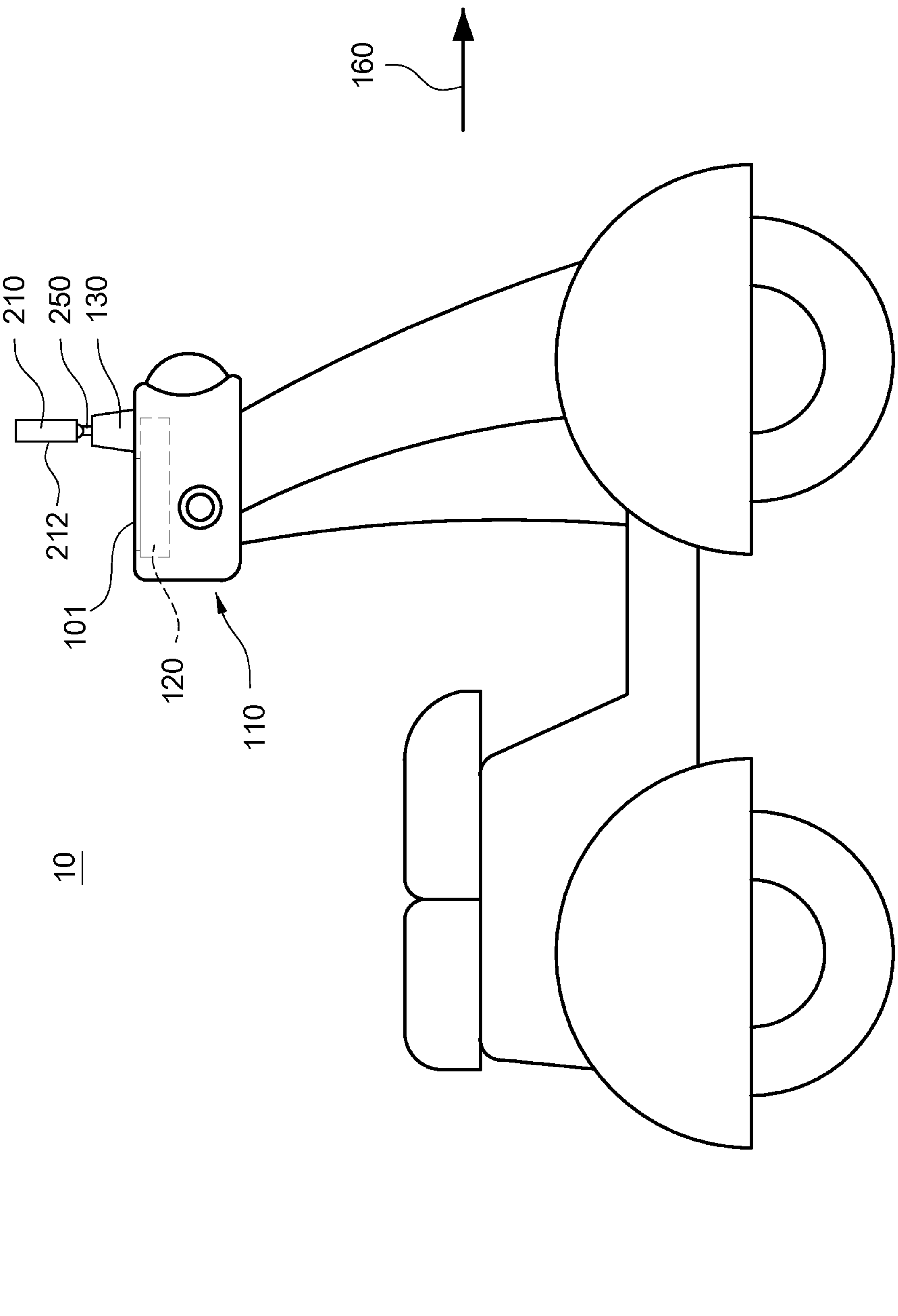
FIG. 1 illustrates a motorcycle head-up display disposed on a motorcycle in accordance with one embodiment of the present disclosure.

The technical terms "first", "second" and the similar terms are used to describe elements for distinguishing the same or similar elements or operations and are not intended to limit the technical elements and the order of the operations in the present disclosure. Furthermore, the element symbols/alphabets can be used repeatedly in each embodiment of the present disclosure. The same and similar technical terms can be represented by the same or similar symbols/alphabets in each embodiment. The repeated symbols/alphabets are provided for simplicity and clarity and they should not be interpreted to limit the relation of the technical terms among the embodiments.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 illustrates a motorcycle head-up display disposed on a motorcycle in accordance with one embodiment of the present disclosure. The motorcycle 10 includes a motorcycle head 110. The motorcycle head 110 includes an accommodating space 120. The accommodating space 120 is configured to accommodate a part of elements of the motorcycle head-up display provided in the disclosure, and the elements include a projecting module, a reflecting mirror, and a controller (not shown in the figure). The motorcycle head 110 includes an upper surface 101, and another part of elements of the motorcycle head-up display may be disposed on the upper surface 101 where another part of elements include a wind shield 130, an adjustable support frame 250, and a display lens 210.

In one embodiment, the wind shield 130 is disposed on the upper surface 101 and provides a windshield space. The wind shield 130 may be a plate structure, a housing, a shield body with an opening, a structure that may accommodate or protect the elements, and in some cases the wind shield 130 is integrally formed with the motorcycle head 110. In one embodiment, the windshield space is an open, half-open, or closed space. Any structure of the wind shield 130 that can provide the windshield space to accommodate an object(s)

and prevents the object from enduring wind resistance in the riding of the motorcycle 10 belongs to the scope of the disclosure.

In one embodiment, the display lens 210 is disposed on the upper surface 101 of the motorcycle head 110 and supported by the adjustable support frame 250 to be mounted on the upper surface 101 of the motorcycle head 110. One or all parts of the adjustable support frame 250 and one or all parts of the display lens 210 may be accommodated in the windshield space of the wind shield 130.

It should be noted that the motorcycle head 110 includes a space to dispose the related dashboard. In one embodiment, the accommodating space 120 of the motorcycle head 110 may provide the space for the related dashboard to be installed herein. The accommodating space 120 of the motorcycle head 110 may be used to install the related dashboard (e.g., the conventional dashboard). In one embodiment, the motorcycle head 110 provided in the disclosure may not include the related dashboard, instead, the motorcycle head-up display is provided in the disclosure to replace the related dashboard. In another embodiment, the accommodating space 120 of the motorcycle head 110 may provide the space for the related dashboard and elements of the motorcycle head-up display.

In one embodiment, the display lens 210 is configured to project a projecting image, such that the projecting image is presented on the display lens 210 for a user to check. In one embodiment, the projecting image includes riding information about the motorcycle 10. As shown in FIG. 1, a direction that a first face 212 of the display lens 210 faces is opposite to a riding direction 160 where the motorcycle 10 moves towards. Therefore, the rider sits on the seat of the motorcycle 10 and checks the projecting image on the first face 212 of the display lens 210 without lowering or slightly lowering his/her head to get the riding information.

Figure 2:
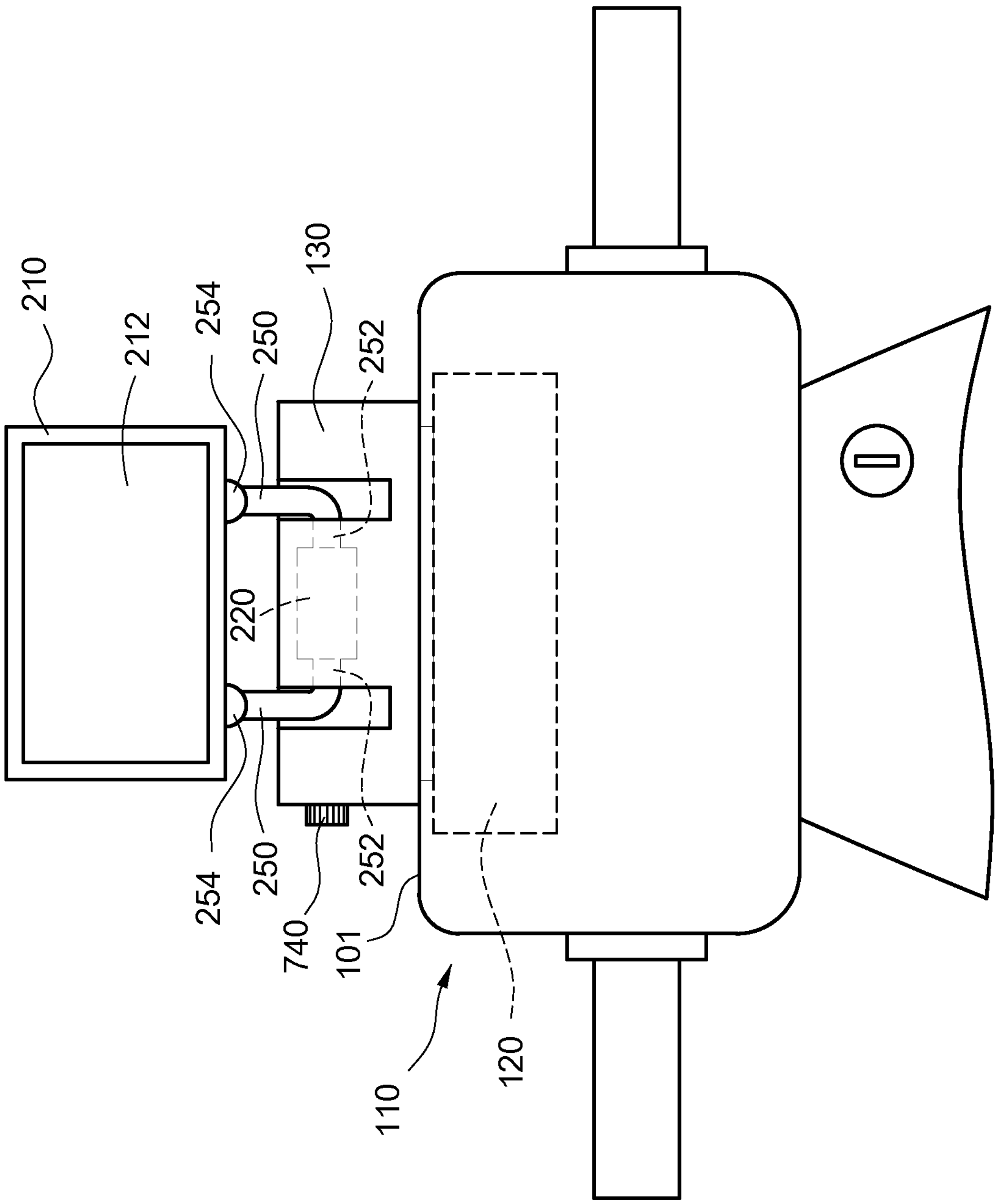
FIG. 2 is a front view of the motorcycle head-up display disposed on a motorcycle head of the motorcycle in accordance with one embodiment of the present disclosure.

Reference is made to FIG. 2. FIG. 2 is a front view of the motorcycle head-up display disposed on a motorcycle head of the motorcycle in accordance with one embodiment of the present disclosure. The wind shield 130 is disposed on the upper surface 101 of the motorcycle head 110. The driving module 220 is disposed in the windshield space of the wind shield 130. The adjustable support frame 250 is configured to support the display lens 210. In one embodiment, the adjustable support frame 250 is provided as a pair. The pair of the adjustable support frame 250 is disposed parallelly between a lower side of the display lens 210 and an upper side of the wind shield 130 in order to increase the support level and the balance level of the display lens 210. Furthermore, the design of the adjustable support frame 250 may decrease the pressure caused by the wind that the motorcycle head-up display endures and improve the stability of the motorcycle head-up display when the motorcycle moves. It should be noted that the number of the adjustable support frame 250 is not limited to two (a pair), in some cases the adjustable support frame 250 may be provided as more than two for supporting the display lens 210.

Figure 3:
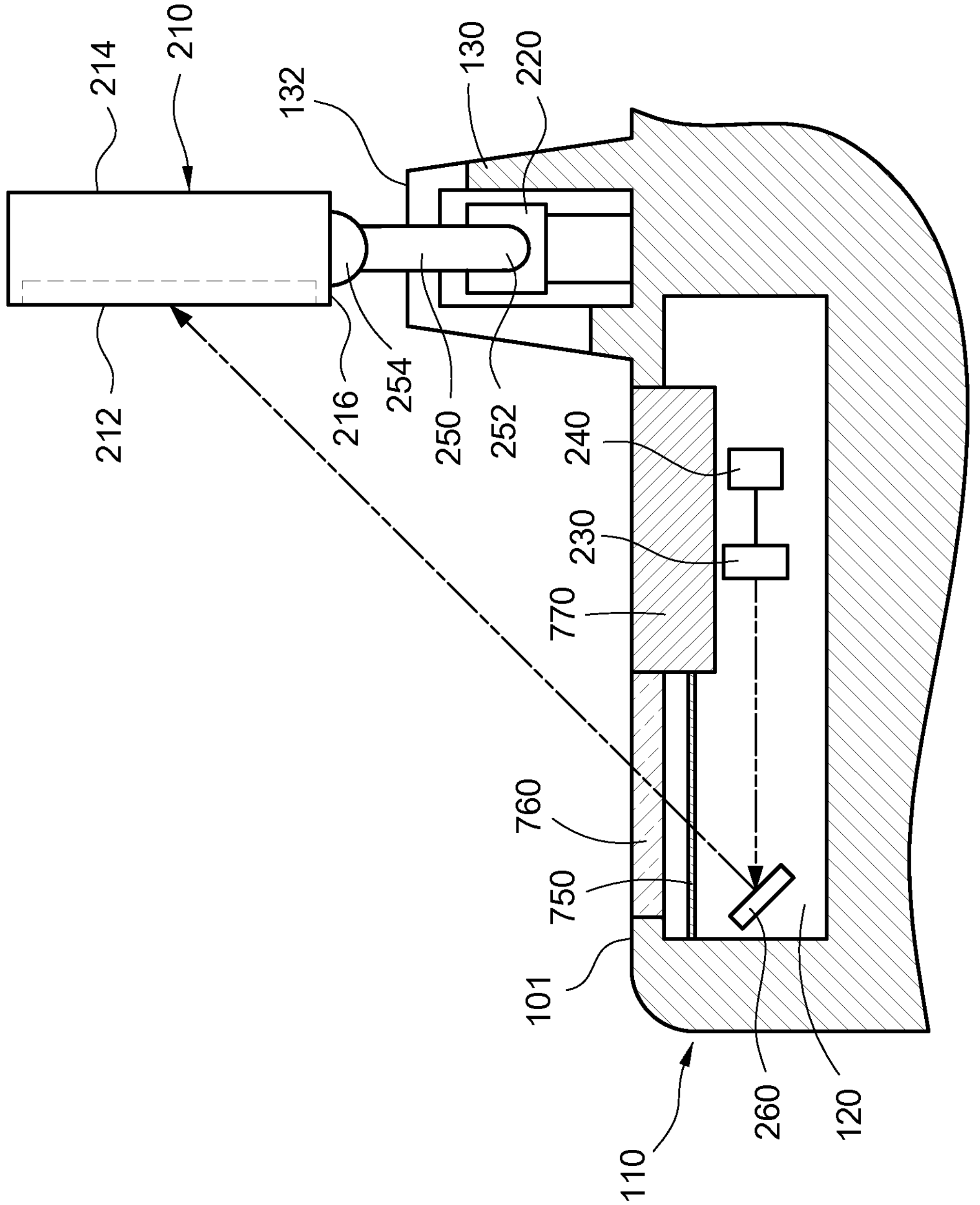
FIG. 3 is a side view of the motorcycle head-up display disposed on the motorcycle head of the motorcycle in accordance with one embodiment of the present disclosure.

Reference is made to FIG. 3. FIG. 3 is a side view of the motorcycle head-up display disposed on the motorcycle head of the motorcycle in accordance with one embodiment of the present disclosure. The motorcycle head-up display includes a display lens 210, a driving module 220, a projecting module 230, a controller 240, and a reflecting mirror 260.

In one embodiment, the projecting module 230, the controller 240, and the reflecting mirror 260 are disposed in the accommodating space 120 of the motorcycle head 110.

As shown in FIG. 3, a light transmitting plate 750 (such as the polarizing plate or the glass plate) is disposed on the top of the accommodating space 120 of the motorcycle head 110, and the transparent cover 760 is disposed on a part of the upper surface 101 of the motorcycle head 110. The direct distance among the reflecting mirror 260, the light transmitting plate 750, the transparent cover 760, and the display lens 210 provides the line-of-sight distance, such that the projecting image outputted by the projecting module 230 penetrates the light transmitting plate 750 and the transparent cover 760 and is then projected onto the display lens 210.

In one embodiment, the projecting module 230 is configured to output the projecting image onto the display lens 210, so the rider may see the projecting image on the display lens 210.

In the embodiment, the motorcycle head-up display and the related dashboard are disposed in the accommodating space 120 of the motorcycle head 110 at the same time. As shown in FIG. 3, the related dashboard 770 is disposed on the upper surface 101 of the motorcycle head 110 other than the position of the transparent cover 760. For example, the related dashboard 770 is disposed between the transparent cover 760 and the wind shield 130, the occupation space of the related dashboard 770 in the accommodating space 120 depends on the volume of the related dashboard 770, and the part of the accommodating space 120 occupied by the related dashboard 770 does not influence the function of the projecting module 230 outputting the projecting image and the line-of-sight distance for the projecting image being projected onto the display lens 210. In the case that the motorcycle head-up display and the related dashboard 770 exist at the same time, the motorcycle head-up display may also display a part or all of the information that the related dashboard displays.

In one embodiment, the projecting module 230 outputs the projecting image towards the reflecting mirror 260, and the reflecting mirror 260 reflects the projecting image with an elevation angle onto the first face 212 of the display lens 210.

In one embodiment, the controller 240 is connected to the driving module 220 and the projecting module 230. The controller 240 connects to the electronic control unit (not shown in FIG. 3) of the motorcycle to retrieve the riding information of the motorcycle. The controller 240 provides the riding information to the projecting module 230, and the projecting module 230 projects the riding information which is carried in part of the projecting image onto the display lens 210.

In one embodiment, the controller 240 may be but not limited to the Application Specific Integrated Circuit (ASIC), the digital signal processors (DSP), the Digital Signal Processing Device, (DSPD), the Programmable Logic Device (PLD), the Field Programmable Gate Array (FPGA), the central processing unit (CPU), the Micro Control Unit (MCU), or the microprocessor.

In one embodiment, the display lens 210 and the driving module 220 are disposed on or above the upper surface 101 of the motorcycle head 110.

In one embodiment, the wind shield 130 is disposed on the upper surface 101, and the driving module 220 is disposed in the windshield space of the wind shield 130. The driving module 220 controls the rotation of the display lens 210 and the height of the display lens 210 respective to the upper surface 101 as described below.

In one embodiment, the driving module 220 may be the stepper motor.

In one embodiment, the motorcycle head-up display includes the adjustable support frame 250. The adjustable support frame 250 is disposed on the motorcycle head 110 and is used to support the display lens 210. In the embodiment, the adjustable support frame 250 includes a first pivot shaft 252 and a second pivot shaft 254 as shown in FIG. 3.

Figure 4:
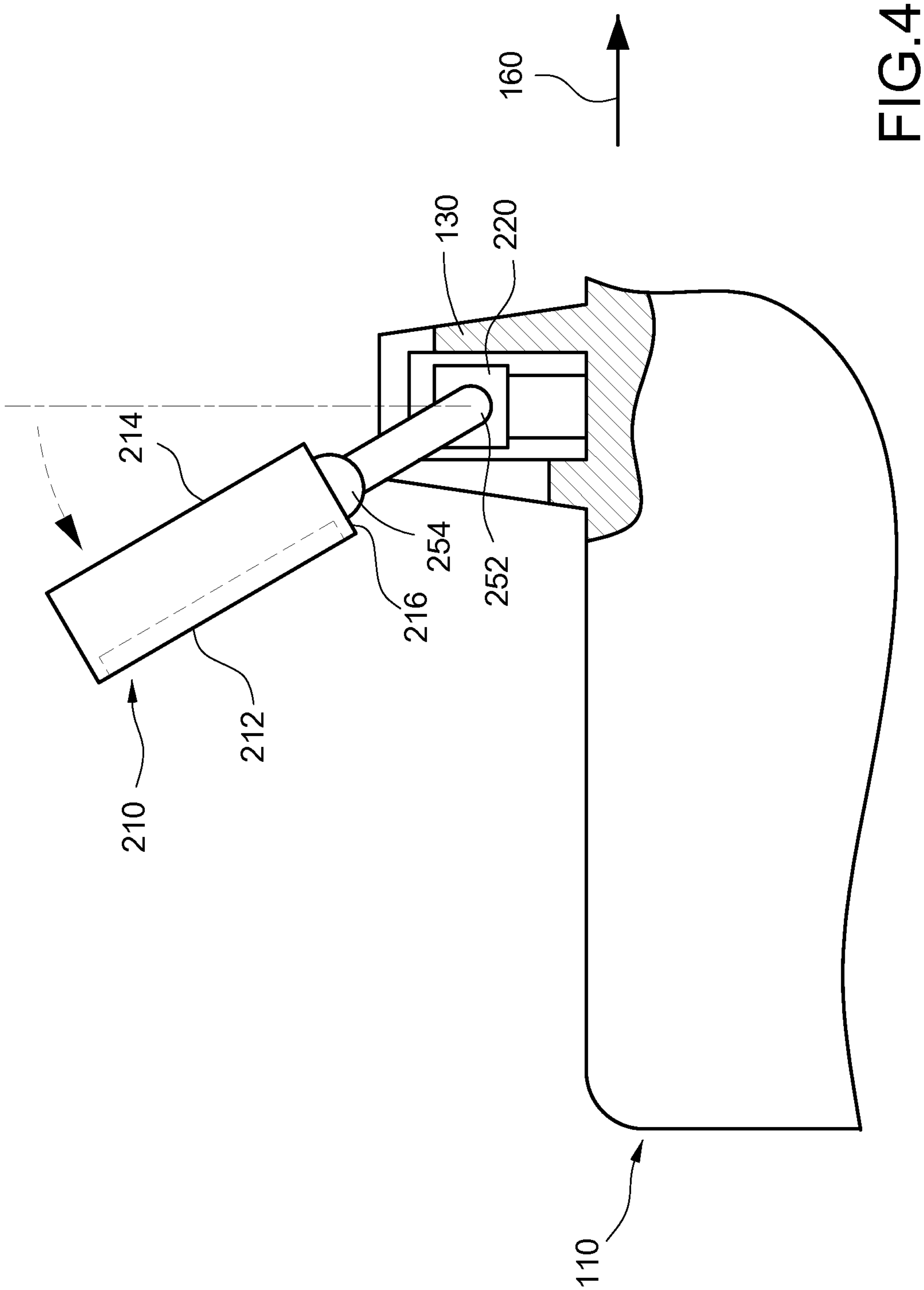
FIGS. 4 and 5 illustrate a display lens that is flipped in accordance with one embodiment of the present disclosure.
Figure 5:
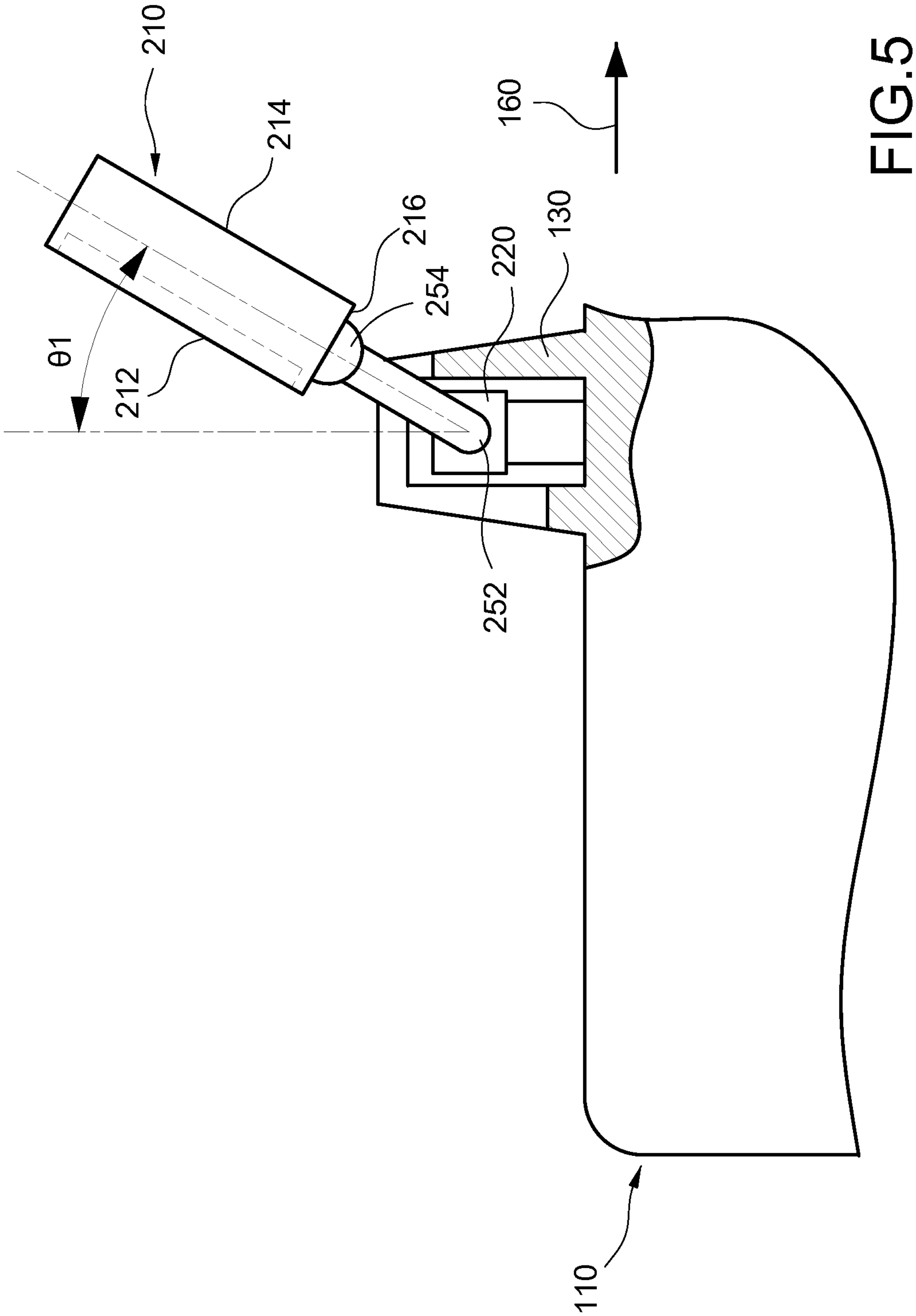

The adjustable support frame 250 is pivotally connected to an upper side 132 of the wind shield 130 through the first pivot shaft 252. The upper side 132 of the wind shield 130 may have a thickness for disposing the first pivot shaft 252. In one embodiment, the driving module 220 controls the first pivot shaft 252 of the adjustable support frame 250, so the display lens 210 flipped with the first pivot shaft 252. Reference is made to FIGS. 4 and 5. FIGS. 4 and 5 illustrate a display lens that is flipped in accordance with one embodiment of the present disclosure.

In the embodiment, the driving module 220 controls the rotation of the first pivot shaft 252, so the display lens 210 is flipped with the first pivot shaft 252 towards the direction that the first face 212 faces (such as the direction opposite to the riding direction 160). In the embodiment, the driving module 220 controls the rotation of the first pivot shaft 252, so the display lens 210 is flipped with the rotation of the first pivot shaft 252 towards the direction that the first face 212 faces (such as the direction opposite to the riding direction 160) as shown in FIG. 4.

In the embodiment, the driving module 220 controls the rotation of the first pivot shaft 252, so the display lens 210 is flipped with the rotation of the first pivot shaft 252 towards the direction that the second face 214 of the display lens 210 faces (i.e., the face opposite to the first face 212) as shown in FIG. 5.

In the embodiments shown in FIGS. 4 and 5, an inclined angle of the display lens 210 may be adjusted based on the angle of view of the rider to decrease the inclined angle when the rider checks the display lens 210.

Referring back to FIG. 3, the adjustable support frame 250 is pivotally connected to a lower side 216 of the display lens 210 through the second pivot shaft 254, so the display lens 210 is flipped with the second pivot shaft 254. In one embodiment, the driving module 220 controls the rotation of the second pivot shaft 254, so the display lens 210 is flipped with the second pivot shaft 254 towards the direction that the first face 212 faces. In another embodiment, the driving module 220 controls the rotation of the second pivot shaft 254, so the display lens 210 is flipped with the second pivot shaft 254 towards the direction that the second face 214 faces. In the embodiment, the inclined angle of the display lens 210 may be adjusted based on the angle of view of the rider to decrease the inclined angle when the rider checks the display lens 210.

For the sake of conciseness, the rotation status of the second pivot shaft 254 is not shown in FIGS. 4 and 5. It should be noted that the second pivot shaft 254 has the function and the structure similar to the first pivot shaft 252, so the second pivot shaft 254 is also controlled by the driving module 220 to perform the rotation similar to the first pivot shaft 252 as shown in FIGS. 4 and 5, and the display lens 210 is flipped with the second pivot shaft 254 towards the direction that the first face 212 or the second face 214 faces.

In one embodiment, the reflecting mirror 260 rotates respective to the inclined angle of the display lens 210. In the default situation, the display lens 210 is installed as shown in FIG. 3 (e.g., the plane of the display lens 210 is approximately perpendicular to the riding direction 160.) In one embodiment, if the display lens 210 is adjusted as the tilt condition shown in FIG. 4, that is, the display lens 210 is flipped towards the direction that the first face 212 faces, the reflecting mirror 260 rotates towards the horizontal plane (e.g., the counterclockwise direction). In another embodiment, if the display lens 210 is adjusted as the tilt condition shown in FIG. 5, that is, the display lens 210 is flipped towards the direction that the second face 214 faces, the reflecting mirror 260 rotates towards the vertical plane (e.g., the clockwise direction). Therefore, the reflection angle of the reflecting mirror 260 is controlled associated with the inclined angle of the display lens 210 to ensure that the projecting image is correctly projected onto the display lens 210.

In one embodiment, when the driving module 220 controls the pair of the adjustable support frames 250, the rotation angles of the first pivot shafts 252 of the two adjustable support frames 250 are the same as each other and the rotation angles of the second pivot shafts 254 of the two adjustable support frames 250 are the same as each other. Therefore, the inclined angles between the display lens 210 and the horizontal plane are the same and the askew situation of the display lens 210 is prevented.

Figure 6:
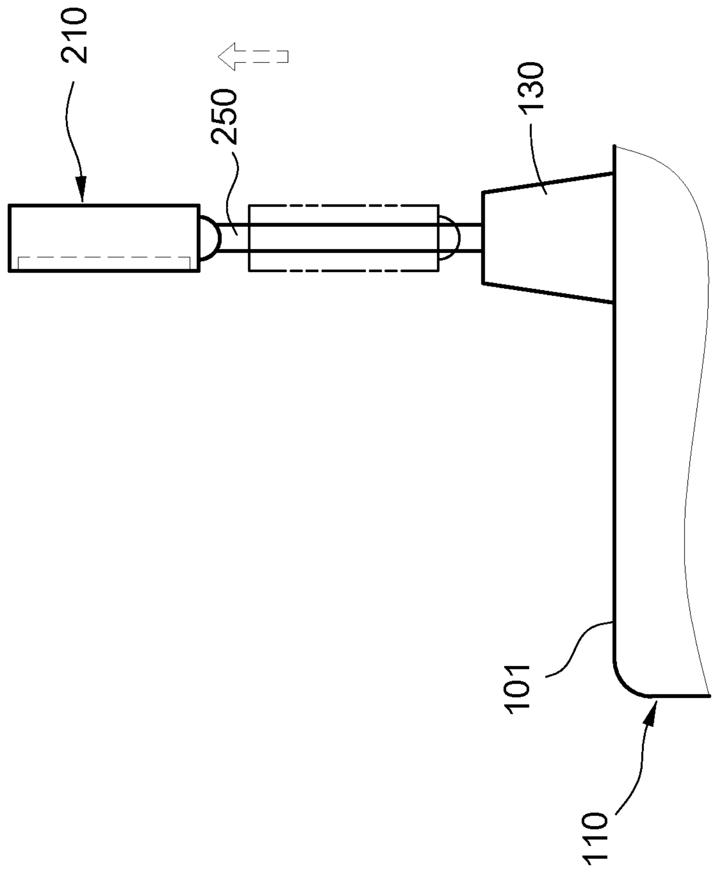
FIG. 6 illustrates the display lens that is raised in accordance with one embodiment of the present disclosure.

In one embodiment, the adjustable support frame 250 may be the telescopic stick or the screw rod. The driving module 220 may control the length of the adjustable support frame 250 to adjust the height of display lens 210 respective to the upper surface 101. Reference is made to FIG. 6. FIG. 6 illustrates the display lens that is raised in accordance with one embodiment of the present disclosure. The driving module 220 lengthens the adjustable support frame 250 to increase the height of the display lens 210 respective to the upper surface 101. In the embodiment, the height of the display lens 210 may be adjusted based on the angle of view of the rider to decrease the inclined angle when the rider checks the display lens 210.

In one embodiment, when the driving module 220 controls the pair of the adjustable support frames 250, the length of each of the two adjustable support frames 250 is the same as each other, so the display lens 210 maintains the same horizontal level.

In another embodiment, all the adjustable support frame 250 and a part or all the display lens 210 may be lowered to be stored in or behind the wind shield 130 based on the design of the adjustable support frame 250. It should be noted that, when the engine of the motorcycle stops and the motorcycle is parked somewhere, the display lens 210 may be damaged by collisions if it remains exposed. The present disclosure provides that the adjustable support frame 250 and the display lens 210 of the motorcycle may be stored in or behind the wind shield 130 when the engine stops, that is, the windshield space of the wind shield 130 is used as the storage space for the adjustable support frame 250 and the display lens 210. In another embodiment, the wind shield 130 may be designed as a shield body having an opening that may be opened or closed and the shield body protects the adjustable support frame 250 and the display lens 210 against the dust or the rain. Therefore, when the engine of the motorcycle stops, the adjustable support frame 250 and the display lens 210 are stored in the windshield space of the wind shield 130 to prevent the adjustable support frame 250 and the display lens 210 from being damaged by wind, rain, or humans, in order to increase the lifetime of the motorcycle head-up display.

In one embodiment, the first face 212 of the display lens 210 shown in FIGS. 1 to 6 is the user-viewing face.

In one embodiment, the controller 240 generates a first command according to the riding information, such that the driving module 220 controls a movement of the display lens 210 according to the first command.

In one embodiment, the riding information includes a riding speed. When the riding speed is greater than a speed threshold, the controller 240 generates the first command to make the driving module 220 shorten the length of the adjustable support frame 250 according to the first command, so the height of the display lens 210 respective to the upper surface 101 is decreased. By decreasing the height of the display lens 210 when the riding speed is too fast, the wind pressure that the adjustable support frame 250 endures is decreased, and the problem that the adjustable support frame 250 is damaged when the motorcycle 10 rides at high speed is solved.

In another embodiment, when the riding speed is greater than the speed threshold, the driving module 220 controls the rotation of the first pivot shaft 252 or the second pivot shaft 254 of the adjustable support frame 250 to flip the display lens 210, so the inclined angle between the display lens 210 and a vertical plane of the motorcycle 10 (such as the plane parallel to the plane shown as the vertical dotted line in FIGS. 4 and 5) is increased. Referring back to FIG. 5, when the driving module 220 controls the rotation of the first pivot shaft 252 of the adjustable support frame 250, the display lens 210 flips with the axis of the first pivot shaft 252 towards the direction that the second face 214 faces. The flipped display lens 210 and the vertical plane form an inclined angle θ1.

Because the inclined angle θ1 between the flipped display lens 210 and the vertical plane becomes larger, the area of the wind resistance is decreased. Therefore, the wind resistance on the display lens 210 is decreased when the motorcycle 10 moves, and the problem that the adjustable support frame 250 is damaged while the display lens 210 endured high pressure is solved.

In another embodiment, when the riding speed is greater than the speed threshold, the controller 240 generates the command and makes the driving module 220 increase the length of the adjustable support frame 250 according to the command, so the height of the display lens 210 respective to the upper surface 101 is increased. Accordingly, when the riding speed is high, the height of the display lens 210 is increased, so an angle of view is provided that the rider may see the projecting image easily and the danger caused when the rider rides at high speed and checks the dashboard of the disclosure by lowering his or her head is decreased.

Figure 7:
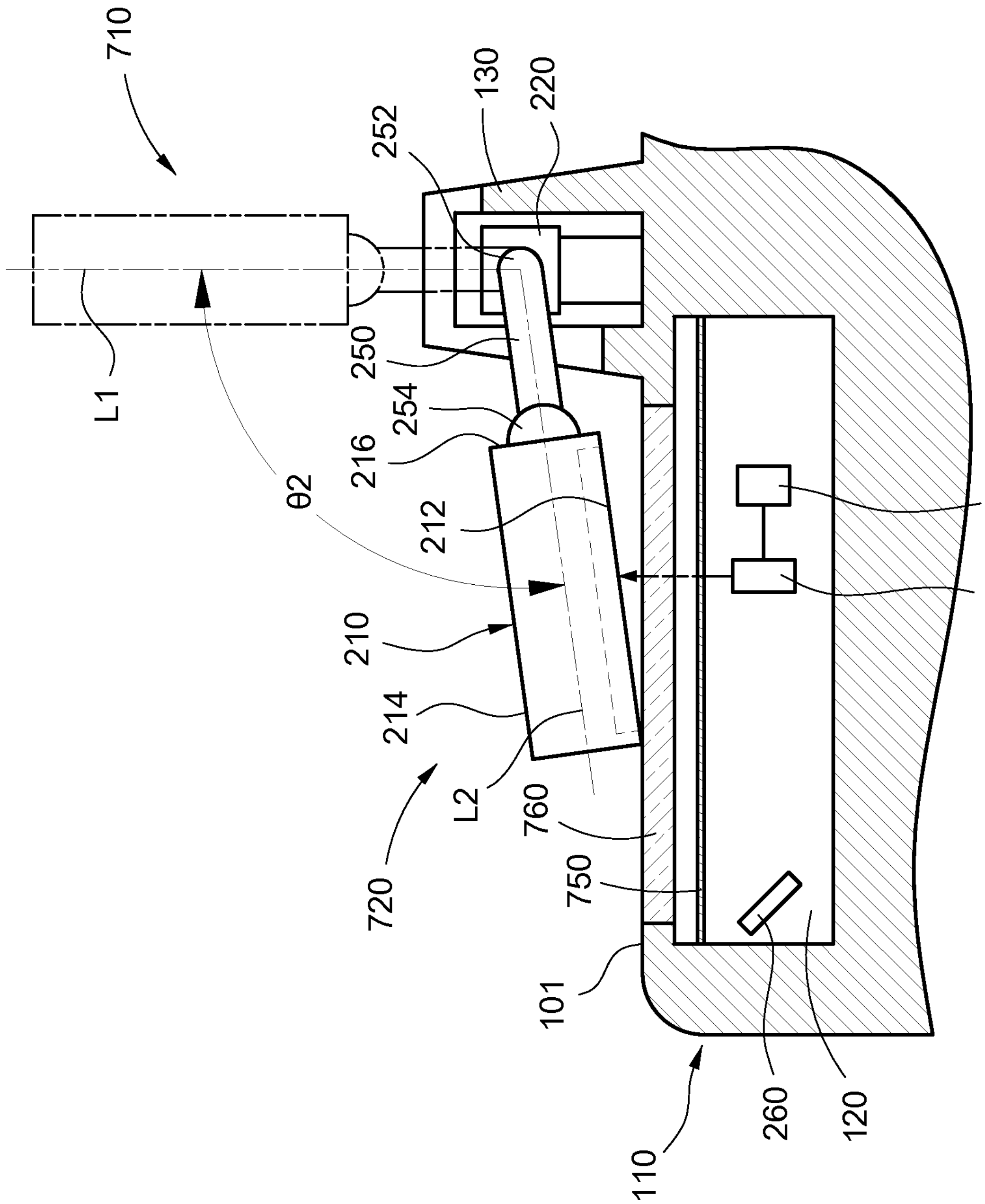
FIG. 7 is a side view of the motorcycle head-up display disposed on the motorcycle head of the motorcycle in accordance with another embodiment of the present disclosure.

Reference is made to FIG. 7. FIG. 7 is a side view of the motorcycle head-up display disposed on the motorcycle head of the motorcycle in accordance with another embodiment of the present disclosure. In one embodiment, the display lens 210 is installed at a first position 710 in default (a first arrangement state), such as the upright state. After receiving a flipping command from the controller 240, the driving module 220 controls the rotation of the first pivot shaft 252 to flip the display lens 210 from the first position 710 towards the direction that the first face 212 of the display lens 210 faces to a second position 720 (a second arrangement state), such as the laying down state. In the embodiment, a first imaginary line L1 parallel to the display lens 210 that is at the first position 710 and a second imaginary line L2 parallel to the display lens 210 that is at the second position 720 cross at the first pivot shaft 252, and the first imaginary line L1 and the second imaginary line L2 provide an angle θ2. In one embodiment, the angle θ2 is less than 180 degrees.

In the embodiment, when the display lens 210 is at the second position 720, the projecting module 230 directly projects the projecting image onto the first face 212 of the display lens 210 without reflecting the projecting image on the reflecting mirror 260. In this case, the second face 214 of the display lens 210 is the user-viewing face that the second face 214 is opposite to the first face 212 of the display lens 210 (e.g., the first face 212 is the front side of the display lens 210 and the second face 214 is the back side of the display lens 210). In other words, the rider gets the riding information from the second face 214 while the riding information is projected onto the first face 212 of the display lens 210.

In one embodiment, the controller 240 may dynamically change the arrangement state of the display lens 210 on the basis of the riding information (such as the riding speed, the engine speed, the left oil quantity, or the tire pressure), the weather forecast (such as the probability of precipitation), the air pollution information, and so on. For example, if the engine speed or the tire pressure is abnormal, the motorcycle 10 may oscillate dramatically. If the display lens 210 is at the first arrangement state (such as the upright state as the first position 710), it is possible that the motorcycle 10 may oscillate and the projecting image may not be projected clearly onto the display lens 210. In this case, the controller 240 may send the flipping command to the driving module 220, so the arrangement state of the display lens 210 is changed to be the laying-down state, i.e., the display lens 210 is flipped to be at the second position 720 laid on the upper surface 101, and the good projection quality is maintained while the motorcycle 10 rides in the oscillation condition.

In another embodiment, the controller 240 may switch the arrangement state of the display lens 210 between the first arrangement state and the second arrangement state based on the user operation.

The position of the display lens 210 in FIG. 7 may switch between the first position 710 and the second position 720. In one embodiment, the projecting module 230 includes two projection cameras (not shown in figures), and a first projecting direction of a projection camera is the direction towards the reflecting mirror 260 (such as the projection pattern in FIG. 3) and a second projecting direction of a second projection camera is the direction towards the light transmitting plate 750 or the transparent cover 760 (such as the projection pattern in FIG. 7). When the display lens 210 is at the first position 710, the first projection camera of the projecting module 230 outputs the projecting image along the first projecting direction. When the display lens 210 is at the second position 720, the second projection camera of the projecting module 230 outputs the projecting image along the second projecting direction.

In another embodiment, the projecting module 230 includes a projection camera (not shown in the figure) and a driving motor (not shown in the figure). The driving motor is connected to the projection camera and configured to control the rotation of the projection camera, such that the projection camera may be rotated at least between the first projecting direction (such as the projection pattern in FIG. 3) and the second projecting direction (such as the projection pattern in FIG. 7). When the display lens 210 is at the first position 710, the projection camera is controlled by the driving motor to rotate to output the projecting image along the first projecting direction, i.e., the direction towards the reflecting mirror 260. When the display lens 210 is switched from the first position 710 to the second position 720, the projection camera is controlled by the driving motor to rotate to output the projecting image along the second projecting direction.

Referring back to FIG. 7, a light transmitting plate 750 (such as the polarizing plate or the glass plate) is covered on the accommodating space 120 of the motorcycle head 110, and the transparent cover 760 is disposed on approximately all the upper surface 101, such that the projecting image outputted by the projecting module 230 is projected through the light transmitting plate 750 and the transparent cover 760 onto the display lens 210. In the embodiment, the motorcycle head-up display is applicable to the motorcycle that the related dashboard is not installed thereon. As described above, when the display lens 210 is changed to be in the laying-down state (the second position 720), the user may get the riding information through the display lens 210 as if he or she checks at the related dashboard. In other words, the motorcycle head-up display is provided to replace the related dashboard of the motorcycle, and the motorcycle head-up display provided in the disclosure may be used as a "new type dashboard" that the user does not need to change his or her current user experience of checking the dashboard and the riding safety is improved when the user checks the dashboard. It should be noted that the display lens 210 works as the function of the dashboard provided in the disclosure, and the projected image presented on the display lens 210 is the content of the dashboard provided in the disclosure.

Referring back to FIG. 2, the motorcycle head-up display includes the knob 740 in one embodiment. The knob 740 may be disposed on any position of the motorcycle head 110 and connected to the driving module 220. The knob 740 may be the mechanical knob that is configured to control the driving module 220 to drive the rotation and the scale of the adjustable support frame 250, so the display lens 210 is flipped and the height of the display lens 210 respective to the motorcycle head 110 is adjusted accordingly.

Figure 8:
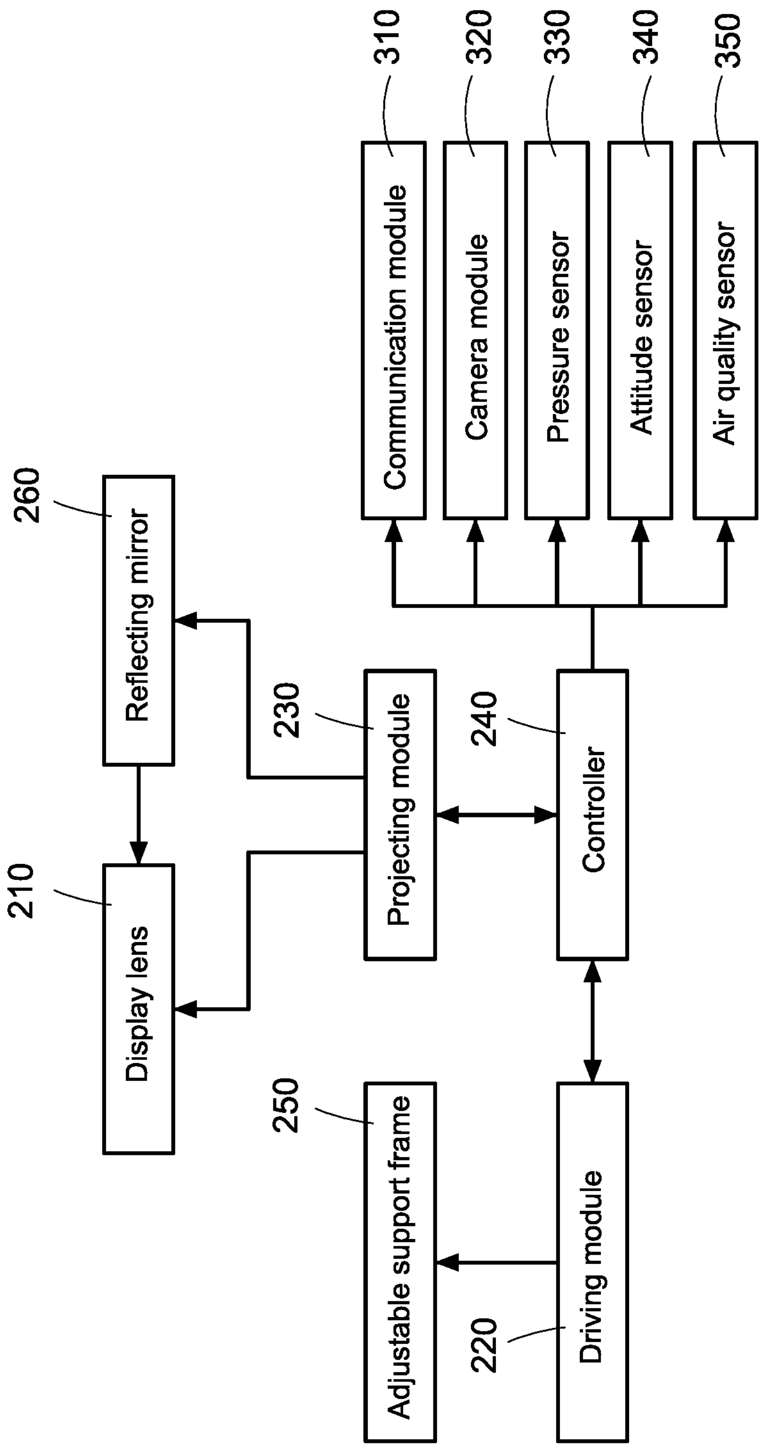
FIG. 8 is a block diagram of the motorcycle head-up display in accordance with another embodiment of the present disclosure.

Reference is made to FIG. 8. FIG. 8 is a block diagram of the motorcycle head-up display in accordance with another embodiment of the present disclosure. The motorcycle head-up display includes the display lens 210, the driving module 220, the projecting module 230, the controller 240, the adjustable support frame 250, and the reflecting mirror 260. For the sake of conciseness, the description of the elements is provided above and is not repeated.

As shown in FIG. 8, the motorcycle head-up display includes a communication module 310, a camera module 320, a pressure sensor 330, an attitude sensor 340, and an air quality sensor 350. The communication module 310, the camera module 320, the pressure sensor 330, the attitude sensor 340, and the air quality sensor 350 are respectively connected to the controller 240.

In one embodiment, the communication module 310 is configured to receive application program information from an electronic device, such that the projecting image presented on the display lens 210 includes the application program information. The electronic device may be the smartphone, the wearable device, the tablet computer, or the notebook, and the electronic device is connected to the communication module 310 of the motorcycle head-up display and controlled by the rider's operation.

In one embodiment, the communication module 310 may be but is not limited to the module complied with Global System for Mobile communication (GSM), Long Term Evolution (LTE), 5th generation mobile networks, Worldwide interoperability for Microwave Access (WiMAX), Wireless Fidelity (Wi-Fi), IEEE 802.11, Bluetooth, or wired network communication module.

In one embodiment, the camera module 320 is disposed on the rear of the motorcycle to continuously retrieve a rear side image behind the motorcycle. The controller 240 computes a vehicle-following distance between the motorcycle and an approaching vehicle coming from behind and an approaching speed of the approaching vehicle coming from behind by using a plurality of the rear side images continuously retrieved. The controller 240 generates a safety warning message and controls the projecting module 230 to output the safety warning message when determining that the vehicle-following distance is less than a safe distance, so the safety warning message is presented on the display lens 210. In the other words, in the embodiment, the projecting image includes the safety warning message generated by the controller 240 based on the vehicle-following distance.

In one embodiment, the camera module 320 may be the camera.

Referring incorporated with FIG. 2 and FIG. 8, in one embodiment, the pressure sensor 330 (not shown in FIG. 2) is disposed on the adjustable support frame 250 to sense the pressure value (such as the wind pressure, the wind scale, the wind speed, the oscillating strength, or the collision).

In one embodiment, the pressure sensor 330 is disposed on the position near the first pivot shaft 252 to sense the pressure value between the adjustable support frame 250 and the wind shield 130. In another embodiment, the pressure sensor 330 (not shown in FIG. 2) is disposed on the position near the second pivot shaft 254 to sense the pressure value between the adjustable support frame 250 and the display lens 210.

In one embodiment, the controller 240 generates a second command when determining that the pressure value is greater than the pressure threshold, so the driving module 220 flips the display lens 210 according to the second command. The processes to flip the display lens 210 is described above and shown in FIGS. 4, 5, and 7 and is not repeated. In the embodiment, the wind resistance is decreased by flipping the display lens 210.

In another embodiment, the controller 240 generates a third command when determining that the pressure value is greater than the pressure threshold, so the driving module 220 shortens the length of the adjustable support frame 250 according to the third command to lower the height of the display lens 210 respective to the upper surface 101. Accordingly, the wind resistance that the display lens 210 and the adjustable support frame 250 endure is decreased.

The embodiments of flipping the display lens 210 and adjusting the height of the display lens 210 may be dynamically modified based on the instant environmental variation, so the arrangement state of the display lens 210 respective to the motorcycle head 110 is adjusted. Accordingly, the motorcycle head-up display provides ease of use and robustness.

In one embodiment, the attitude sensor 340 is disposed on any position of the motorcycle 10 and configured to sense attitude information of the motorcycle 10. The attitude information is, for example, the location varying information, the angle varying information, or the displacement varying information. When the controller 240 determines that the motorcycle 10 is in the falling down state according to the attitude information, falling down information is sent to the electronic device of the rider or another user through the communication module 310 to notify the rider or another user about the traffic accident, the stealing event, or the vandalism event.

The electronic device may be but is not limited to the portable electronic device, the tablet computer, or the notebook.

In one embodiment, the attitude sensor 340 can be but is not limited to the accelerometer, the angular rate sensor, the three-axis gyro, or the six-axis gyro.

In one embodiment, the air quality sensor 350 is disposed on any position of the motorcycle and configured to sense the air quality value of the environment. In the environment, the projecting image that is presented on the display lens 210 includes the instant air quality value sensed by the air quality sensor 350.

In one embodiment, the air quality sensor 350 may be but is not limited to the PM2.5 sensor.

In one embodiment, the controller 240 is connected to the electronic control unit of the motorcycle 10 (not shown in FIG. 8) to receive the riding information of the motorcycle 10. The riding information includes the riding speed, the engine speed, the battery power, the left oil quantity, the tire pressure of the motorcycle 10, and other data retrieved from the vehicle computer.

The projecting image presented on the display lens 210 includes the riding information. The rider may select which information to be presented on the display lens 210, so the content of the projecting image is customized.

Figure 9:
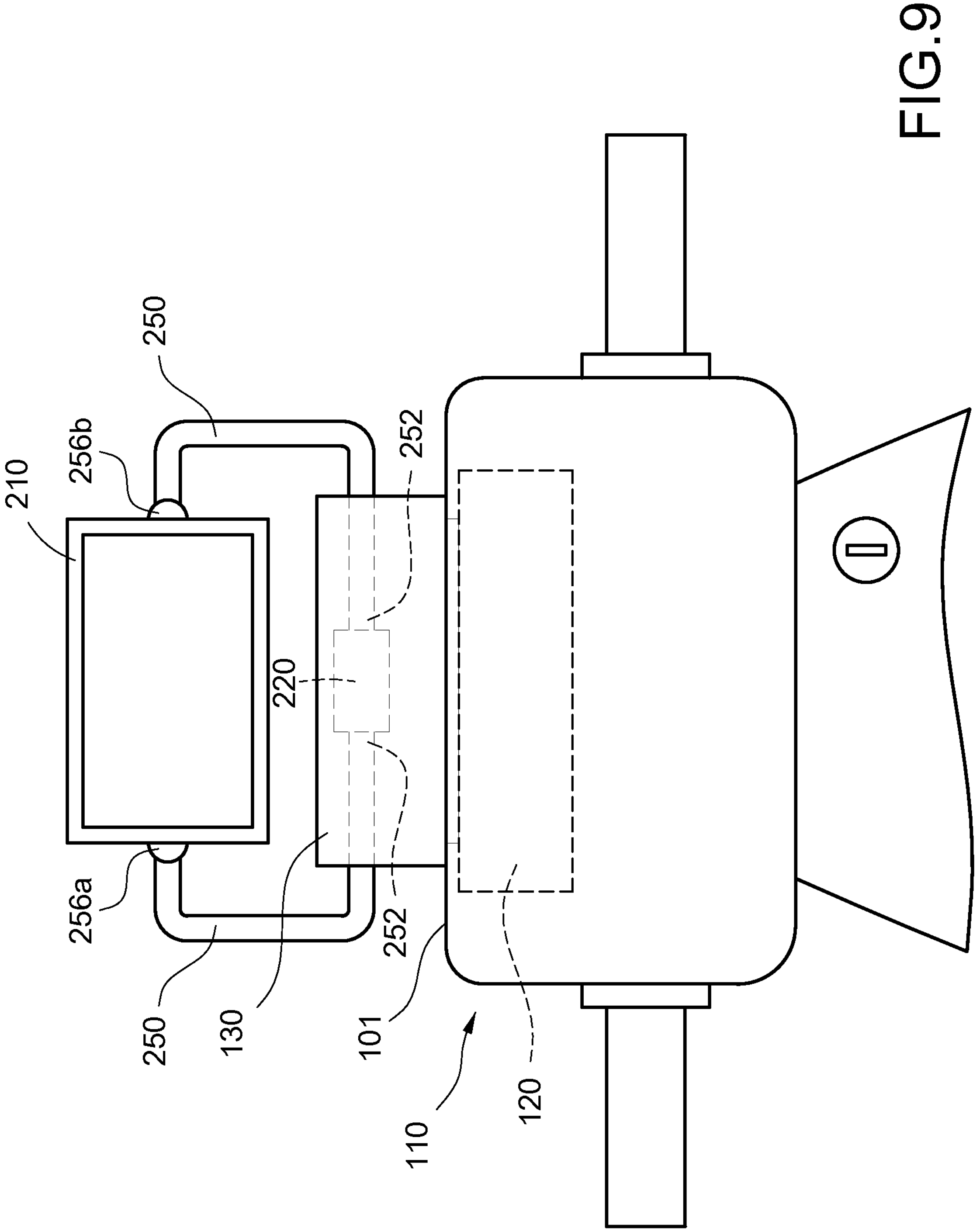
FIG. 9 is a front view of the motorcycle head-up display disposed on the motorcycle head of the motorcycle in accordance with another embodiment of the present disclosure.

Reference is made to FIG. 9. FIG. 9 is a front view of the motorcycle head-up display disposed on the motorcycle head of the motorcycle in accordance with another embodiment of the present disclosure. Compared with the motorcycle head-up display in FIG. 3, the adjustable support frames 250 of the motorcycle head-up display in FIG. 9 are provided in a pair. The adjustable support frames 250 are pivotally connected to the left side and the right side of the display lens 210 respectively through two second pivot shafts 256*a* and 256*b*, so the display lens 210 is flipped with the rotation of the second pivot shafts 256*a* and 256*b*. The second pivot shafts 256*a* and 256*b* that are pivotally connected to the left side and the right side of the display lens 210 have the same height, so the display lens 210 is flipped with the horizontal axis formed by the second pivot shafts 256*a* and 256*b* on the left and right side of the display lens 210.

Figure 10:
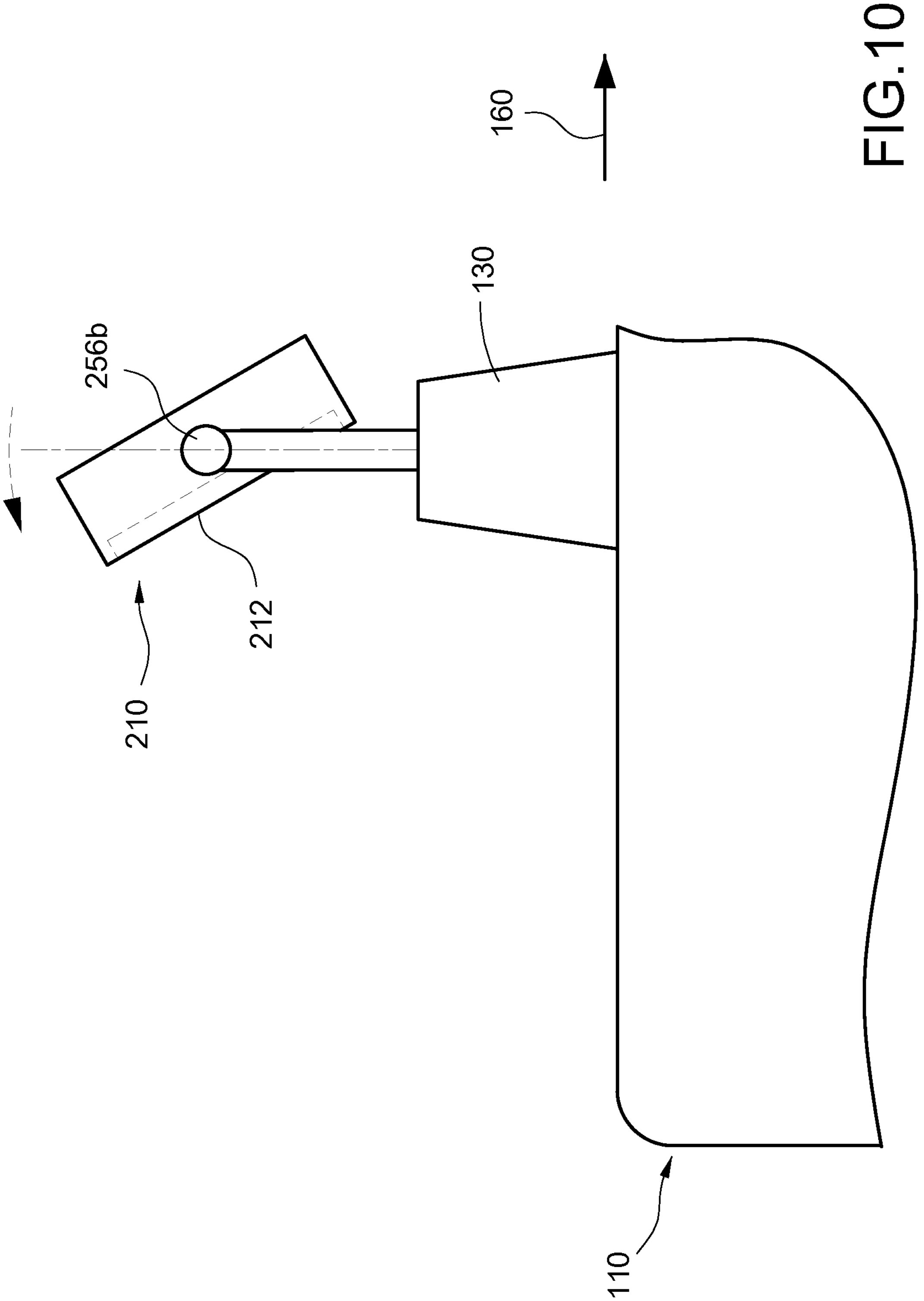
FIGS. 10 and 11 illustrate the display lens that is flipped in accordance with another embodiment of the present disclosure.
Figure 11:
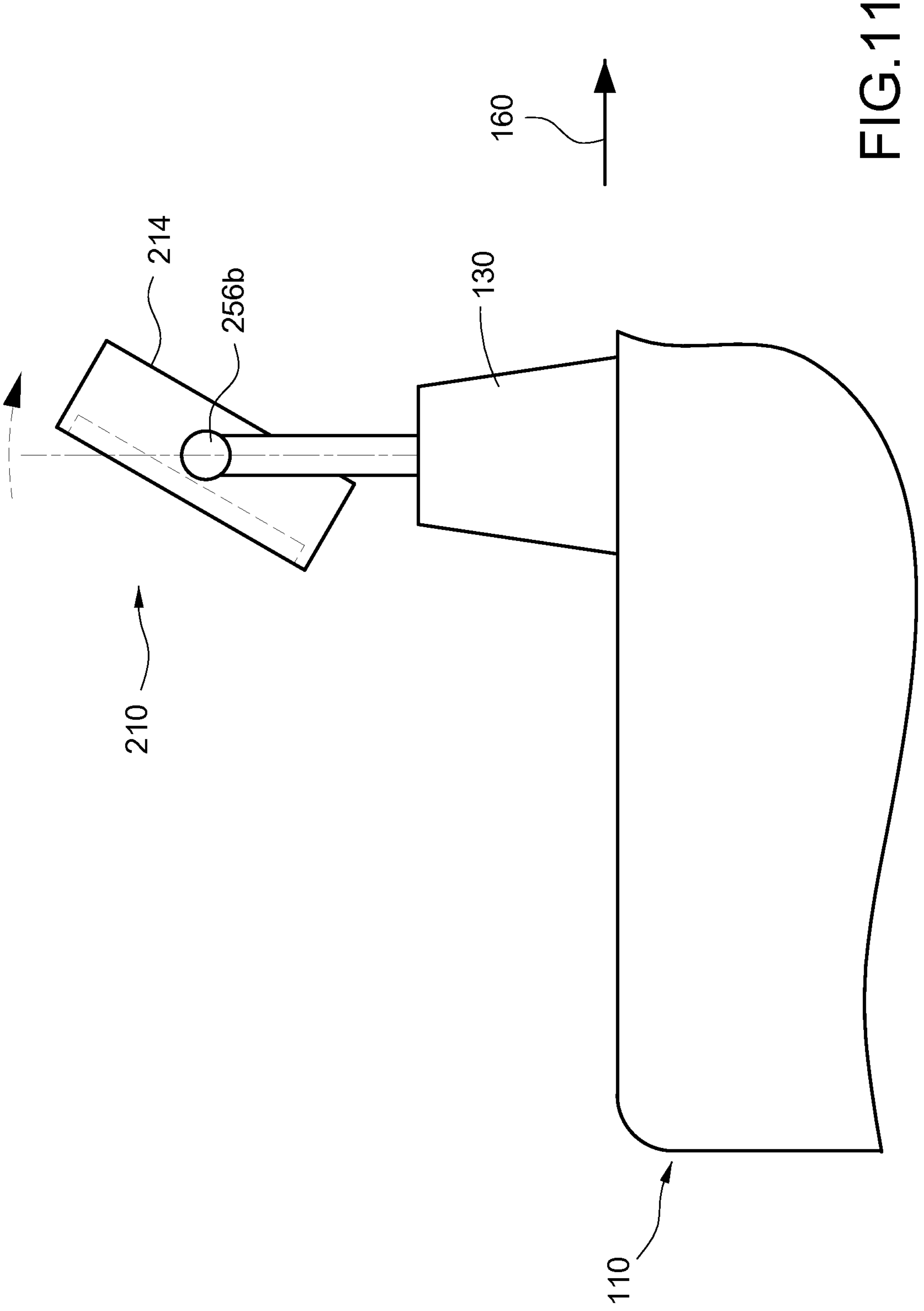

Reference is made to FIGS. 10 and 11. FIGS. 10 and 11 illustrate the display lens that is flipped in accordance with another embodiment of the present disclosure. In the embodiment of FIG. 10, the driving module 220 controls the rotation of the second pivot shafts 256*a* (not shown in the figure) and 256*b*, so the display lens 210 is flipped with the rotation of the second pivot shafts 256*a* and 256*b* towards the direction that the first face 212 of the display lens 210 faces (such as the direction opposite to the riding direction 160). In the embodiment of FIG. 11, the driving module 220 controls the rotation of the second pivot shafts 256*a* and 256*b*, so the display lens 210 is flipped with the rotation of the second pivot shafts 256*a* and 256*b* towards the direction that the second face 214 of the display lens 210 faces (such as the riding direction 160). In the embodiment, the inclined angle of the display lens 210 may be adjusted based on the angle of view of the rider to decrease the inclined angle that the rider checks the display lens 210.

It should be noted that the operations of the motorcycle head-up display described with FIGS. 1 to 8 above may be performed to the motorcycle head-up display illustrated in FIGS. 9 to 11 and similar operations are not repeated herein.

As described above, the motorcycle head-up display applicable to the motorcycle may replace or cooperate with the related dashboard, so the content of the dashboard in the present disclosure can be customized and not limited to the information provided by the vehicle computer. Furthermore, the structure design can decrease wind resistance, so the lifetime of the motorcycle head-up display is lengthened. In addition, the height of the motorcycle head-up display can be dynamically controlled according to the riding information, so the rider can easily get the riding information without losing his or her attention in the traffic and the assistance from the motorcycle head-up display for the rider while riding is improved. Compared with the related dashboard, the motorcycle head-up display provided in the disclosure improves riding safety because the rider does not have to lower his or her head for checking the dashboard.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A motorcycle head-up display, applicable to a motorcycle comprising a motorcycle head and an electronic control unit, comprising:

- a display lens, disposed on an upper surface of the motorcycle head;
- an adjustable support frame, disposed on the motorcycle head and configured to support the display lens, having a first pivot shaft, wherein the adjustable support frame is pivotally connected to an upper side of a wind shield;
- a stepper motor, disposed in a windshield space of the wind shield, mechanically coupled to the adjustable support frame through the first pivot shaft in the windshield space, wherein the adjustable support frame is a telescopic stick or a screw rod, and the stepper motor is configured to control a length of the adjustable support frame to adjust a height of the display lens respective to the upper surface;
- a projecting module, disposed inside an accommodating space of the motorcycle head and configured to output a projecting image onto the display lens; and
- a controller, connected to the projecting module and the stepper motor and configured to retrieve riding information of the motorcycle from the electronic control unit and generate a first command according to the riding information;
- wherein the stepper motor is configured to control a movement of the display lens according to the first command.

2. The motorcycle head-up display of claim 1, wherein the stepper motor is configured to flip the display lens.

3. The motorcycle head-up display of claim 2, wherein the stepper motor is configured to control the first pivot shaft of the adjustable support frame for the display lens to flip with the first pivot shaft, wherein the wind shield is disposed on the upper surface of the motorcycle head.

4. The motorcycle head-up display of claim 3, further comprising a pressure sensor, wherein the pressure sensor is disposed on the adjustable support frame and configured to sense a pressure value between the adjustable support frame and the wind shield or between the adjustable support frame and the display lens, wherein the controller is configured to generate a second command when the pressure value is greater than a pressure threshold for the stepper motor to flip the display lens according to the second command.

5. The motorcycle head-up display of claim 3, wherein the riding information comprises a riding speed, and the stepper motor is configured to control a rotation of the first pivot shaft to flip the display lens in order to increase an inclined angle of the display lens respective to a vertical plane when the riding speed is greater than a speed threshold.

6. The motorcycle head-up display of claim 3, wherein the stepper motor is configured to control a rotation of the first pivot shaft for the display lens to be flipped from a first position toward a direction that a first face of the display lens faces to a second position, wherein a first imaginary line of the first position and a second imaginary line of the second position cross at the first pivot shaft, an intersection angle is provided between the first imaginary line and the second imaginary line, and the intersection angle is less than 180 degrees.

7. The motorcycle head-up display of claim 6, further comprising:

a reflecting mirror, disposed inside the accommodating space and configured to reflect the projecting image with an elevation angle onto the first face of the display lens when the display lens is at the first position, wherein the first face is a user-viewing face.

8. The motorcycle head-up display of claim 6, wherein the projecting module is configured to output the projecting image to the first face of the display lens when the display lens is at the second position, and a second face of the display lens respective to the first face is a user-viewing face.

9. The motorcycle head-up display of claim 3, wherein the adjustable support frame comprises a second pivot shaft respective to the first pivot shaft, the adjustable support frame is provided in a pair, the pair of the adjustable support frames is pivotally connected to a left side of the display lens and to a right side of the display lens respectively through two of the second pivot shafts, and the display lens is configured to be flipped with the second pivot shaft.

10. The motorcycle head-up display of claim 3, wherein the adjustable support frame comprises a second pivot shaft relative to the first pivot shaft, and the adjustable support frame is pivotally connected to a lower side of the display lens through the second pivot shaft, wherein the display lens is configured to flip with the second pivot shaft.

11. The motorcycle head-up display of claim 10, wherein the adjustable support frame is provided in a pair and the pair of the adjustable support frames is parallelly disposed between the lower side of the display lens and the upper side of the wind shield.

12. The motorcycle head-up display of claim 1, wherein the riding information comprises a riding speed, and the stepper motor is configured to shorten the length of the adjustable support frame when the riding speed is greater than a speed threshold to lower the height of the display lens respective to the upper surface.

13. The motorcycle head-up display of claim 12, further comprising a pressure sensor, wherein the pressure sensor is disposed on the adjustable support frame and configured to sense a pressure value of the adjustable support frame, and the controller is configured to generate a third command when the pressure value is greater than a pressure threshold for the stepper motor to shorten the length of the adjustable support frame according to the third command to lower the height of the display lens respective to the upper surface.

14. The motorcycle head-up display of claim 12, wherein the stepper motor is configured to shorten the length of the adjustable support frame for one or all parts of the adjustable support frame and the display lens to be accommodated inside a windshield space of a wind shield, wherein the wind shield is disposed on the upper surface and forms the windshield space.

15. The motorcycle head-up display of claim 1, wherein a transparent cover is disposed on part or all of the upper surface of the motorcycle head, and the projecting module outputs the projecting image through the transparent cover onto the display lens.

16. The motorcycle head-up display of claim 1, further comprising a knob disposed on the motorcycle head connected to the stepper motor and configured to mechanically control a rotation of the display lens and the height of the display lens respective to the motorcycle head.

17. The motorcycle head-up display of claim 1, further comprising a communication module connected to the controller and configured to receive application program information from an electronic device, wherein the projecting image comprises the application program information.

18. The motorcycle head-up display of claim 17, further comprising an attitude sensor disposed on the motorcycle, connected to the controller and configured to sense attitude information of the motorcycle, wherein the controller is configured to send a motorcycle falling down message through the communication module to the electronic device when determining that the motorcycle is in a falling down state.

19. The motorcycle head-up display of claim 1, further comprising a camera module disposed on the motorcycle, connected to the controller and configured to sense a rear side image, wherein the controller is configured to compute a vehicle-following distance between the motorcycle and an approaching vehicle coming from behind by using the rear side image and generate a safety warning message when the vehicle-following distance is less than a safe distance, wherein the projecting image comprises the safety warning message.

* * * * *